Dec. 30, 1947. H. J. KALAJIAN 2,433,762
AIRPLANE WHEEL BALANCING WEIGHT
Filed Aug. 14, 1944

Inventor
HARRY J. KALAJIAN
By Beaman & Langford
Attorneys

Patented Dec. 30, 1947

2,433,762

UNITED STATES PATENT OFFICE 2,433,762

AIRPLANE WHEEL BALANCING WEIGHT

Harry J. Kalajian, Detroit, Mich., assignor to Harley C. Loney Company, Detroit, Mich., a corporation of Michigan Application August 14, 1944, Serial No. 549,330

4 Claims. (Cl. 301—5)

The present invention relates to improvements in balance weights, being a modification of the construction shown in my copending application Serial No. 543,350, filed July 3, 1944.

The object of the present invention is to provide a balance weight particularly adapted to be installed on reinforcing flanges and web structures of aircraft and heavy duty vehicle wheels.

Another object of the invention provides a balance weight capable of being rigidly supported on a flange, web or similar structure by merely forcing the clamping jaws over the supporting structure.

Still another object is to provide a balance weight employing one or more sets of opposed gripping spring members positioned to yield in one direction to a supporting flange.

Other objects and advantages residing in the details, construction and arrangement and combination of parts will appear from the following specification and claims.

Figure 1:
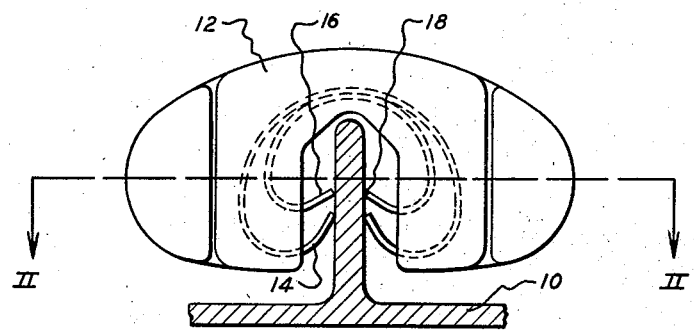
Fig. 1 shows the manner in which the balance weight is supported on the flange.
Figure 2:
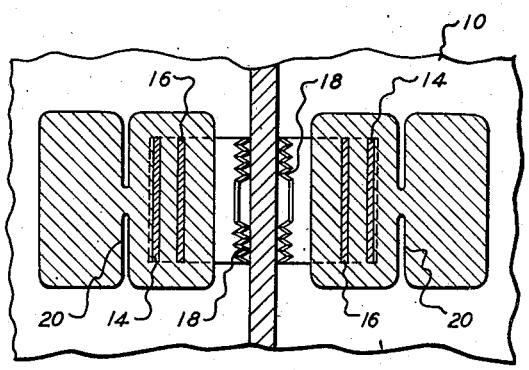
Fig. 2 is a cross-sectional view taken on line II—II of Fig. 1.
Figure 3:
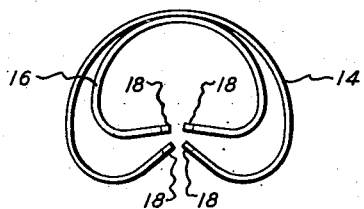
Fig. 3 shows the resilient springs prior to being molded in the weight body.

As shown in the drawing, the balance weight preferably comprises a cast body portion 12 having arcuate spring metal clips 14 and 16 molded in position therein. Because of its high specific gravity, the weight 12 may be advantageously cast from a lead alloy. The weight is shown with transverse grooves 20 which provide transverse planes for convenient severing of portions of the balance weight to enable varying the mass of the weight to take care of different out-of-balance conditions. This arrangement also reduces the inventory of different size weights required to be carried in stock.

It will be noted that the spring metal clips 14 and 16 are provided with toothed portions 18. As more clearly shown in Fig. 1, the opposed end portions of the clips 14 and 16, in which the tooth portions 18 are defined, are slightly angularly disposed to the supporting structure 10. It should be readily understood that in applying the weight 12 the supporting structure 10 is forced between the restricted throats between the clips 14 and 16, and because of the angularity between the clips 14 and 16 and the supporting structure 10 movement in one direction is rigidly resisted, the portions 18 having the tendency to dig into the supporting structure 10. By having two sets of opposed teeth portions 18, the weight 12 is rigidly supported on a flange or fin of the structure 10.

Having thus described my invention what I desire to secure by Letters Patent and claim is:

1. A balance weight for push on attachment to a supporting flange comprising a body portion, and a pair of nested arcuate attachment clips of spring metal presenting a resilient restricted throat portion to receive the supporting flange.

2. A balance weight for push on attachment to a supporting flange comprising a body portion having a transverse recess therein adapted to receive the supporting flange, and opposed resilient attachment portions extending into the said recess presenting a resilient restricted throat to receive the supporting flange.

3. A balance weight for push on attachment to a supporting flange comprising a body portion, an attachment portion in the form of a pair of opposed resilient spring metal members, said members being angularly disposed to yield in one direction to the supporting flange.

4. A balance weight for push on attachment to a supporting flange comprising a body portion, an attachment clip in the form of a pair of opposed spring metal parts defining a restricted throat, the opposed edges of said parts being serrated, said parts being angularly disposed to each other so as to yield in one direction to the supporting flange projected into said throat.

HARRY J. KALAJIAN.

REFERENCES CITED

The following references are of record in the file of this patent:

UNITED STATES PATENTS

| Number | Name | Date |
|---|---|---|
| 2,202,129 | Turner | May 28, 1940 |
| Re. 21,769 | Tinnerman | Apr. 8, 1941 |
| 2,191,780 | Tinnerman | Feb. 27, 1940 |
| 2,304,816 | Griffith | Dec. 15, 1942 |
| 1,817,776 | Sipe | Aug. 4, 1931 |